(12) United States Patent
Fuhrmann

(10) Patent No.: US 8,693,488 B2
(45) Date of Patent: Apr. 8, 2014

(54) METHOD OF TRANSMITTING MESSAGES

(75) Inventor: Peter Fuhrmann, Aachen (DE)

(73) Assignee: NXP B.V., Eindhoven (NL)

( * ) Notice: Subject to any disclaimer, the term of this patent is extended or adjusted under 35 U.S.C. 154(b) by 1713 days.

(21) Appl. No.: 12/066,121

(22) PCT Filed: Sep. 5, 2006

(86) PCT No.: PCT/IB2006/053112
§ 371 (c)(1),
(2), (4) Date: Mar. 7, 2008

(87) PCT Pub. No.: WO2007/031903
PCT Pub. Date: Mar. 22, 2007

(65) Prior Publication Data
US 2008/0225836 A1 Sep. 18, 2008

(30) Foreign Application Priority Data
Sep. 13, 2005 (EP) .................................. 05108372

(51) Int. Cl.
*H04L 12/28* (2006.01)
(52) U.S. Cl.
USPC ......................................................... 370/412
(58) Field of Classification Search
None
See application file for complete search history.

(56) References Cited

U.S. PATENT DOCUMENTS

| | | | |
|---|---|---|---|
| 4,933,935 A * | 6/1990 | Adams | 370/406 |
| 7,912,080 B2 | 3/2011 | Berwanger et al. | |
| 2003/0095562 A1 | 5/2003 | Liu et al. | |
| 2004/0037558 A1* | 2/2004 | Beshai | 398/57 |
| 2004/0090962 A1* | 5/2004 | Forest et al. | 370/392 |
| 2006/0171386 A1* | 8/2006 | Hesse et al. | 370/389 |
| 2006/0224394 A1 | 10/2006 | Ungermann et al. | |
| 2006/0259204 A1* | 11/2006 | Jordan et al. | 701/1 |

FOREIGN PATENT DOCUMENTS

| | | |
|---|---|---|
| DE | 10329179 A1 | 3/2005 |
| EP | 1355458 A2 | 10/2003 |
| GB | 2389492 A | 10/2003 |
| JP | 2004-348638 A | 12/2004 |
| JP | 2005-513959 A | 5/2005 |
| JP | 2006-525725 A | 11/2006 |

OTHER PUBLICATIONS

Belschner, Ralph; et al "Flexray Requirements Specification" Internet Citation, May 16, 2002 Downloaded From: http://www.informatik.uni-ulm.de/rs/projekte/core/rtsl/.

* cited by examiner

Primary Examiner — Otis L Thompson, Jr.

(57) ABSTRACT

To provide a method of transmitting messages, using a transmission protocol having time-slots, that allows the messages to be transmitted in a flexible way, it is proposed that each message has a message identifier assigned to it, that the messages are placed in order in a queue, and that the queue has a set of slot identifiers assigned to it.

17 Claims, 2 Drawing Sheets

Msg Heap (Node A)

| MID10 | | | | |
|---|---|---|---|---|
| MID6 | MID7 | | | |
| MID10 | MID10 | MID7 | | |
| MID4 | MID6 | MID7 | MID7 | |
| MID8 | MID10 | MID10 | MID7 | ... |

Msg Heap (Node B)

| -/- | -/- | MID11 | -/- | ... |
|---|---|---|---|---|

FlexRay Communication Pattern

| | XXX | |MID8 |MID4 | XXX | |MID10 |MID6 | XXX | |MID11 |MID10 | | XXX | |MID7 |MID7 |... |
|---|---|---|---|---|---|---|---|
| |SID1 .. SID3| |SID5 |SID6 |SID1 ... SID3| |SID5 |SID6 |SID1 ... SID3 |SID4 |SID6 | |SID1 .. SID3 |SID5 |SID6 |... |
| Cycle z | | Cycle z+1 | | Cycle z+2 | | Cycle z+3 | | |

→ t

METHOD OF TRANSMITTING MESSAGES

The invention relates to a method of transmitting messages using a transmission protocol having time-slots.

In communications systems, which are usually formed by a plurality of nodes arranged in the form of a network, messages are exchanged between the individual nodes, to enable, amongst other things, information to be passed on. Communication systems of this kind may for example be used to control complicated technical arrangements having a plurality of sensors, actuators and the like, preferably from a central control unit. Systems of this kind are used in particular in automotive engineering to enable, for example, signals from an acceleration sensor to be directed to a central control unit. If the acceleration sensor senses that a limiting value of acceleration is being exceeded, a signal to this effect is passed on to the control unit, which latter then, among other things, triggers an airbag. It is particularly necessary in this case for safety-related messages or information to be passed on reliably. Access to a transmission medium or a channel, in the form of an electrical signal lead for a node for example, is controlled by a media access control (MAC) protocol.

Particularly in automotive engineering, there are new types of transmission protocols that are being used for message transmission, such as for example the protocol that is known to the person skilled in the art as FlexRay. This protocol uses time-multiplex data transmission frames, i.e. a cyclic repetition of the message transmissions, which are divided into two different segments, namely a static one and a dynamic one. What is used in the static segment is medium access control based on time-slots of a fixed length, whereas what is used in the dynamic segment is a scheme based on priorities. The term time-slot is one known from TDMA systems that is derived from the pattern over time in which the individual users, i.e. nodes, are given the exclusive right to transmit (media access) under the time-multiplexing process. In the present case, the term time-slot will also be applied in what follows to the interval of time for which a node receives or claims the right to transmit e.g. in the dynamic segment of FlexRay systems or even of CAN systems. In CAN systems, the allocation of the right to transmit results from priorities and a no-loss arbitration, while in the dynamic segment of FlexRay it is by a mini-slotting process that controls media access by means of a virtual token. If one of the nodes has the right to transmit, it is able to dispatch a message of variable length, i.e. in this case the term "time-slot" does not necessarily mean a constant interval of time.

Each time-slot is identified by what is termed a slot identifier (SID) in the form of a number, the numbers beginning for example at SID=1 at the beginning of a cycle. The fixed number of time-slots that a cycle has is for example six, i.e. it has an SID range from 1 to 6.

For this purpose it is known for there to be provided, in addition, in a buffer store in which a message or data to be transmitted is stored, a means of registering the time-slot that is assigned, to enable the stored messages to be transmitted in the time-slot laid down. In this way, the message to be transmitted by this buffer store is always coupled to a given time-slot.

This method is particularly advantageous for messages that constantly recur and that are emitted for example by one node on the network. These messages may for example be a signal giving the current speed of the motor vehicle that is to be passed on to a speedometer. Because of the fixed time-slot, it is thus already known, in theory, in a component that receives the message, such as for example in the central control unit or host of the communications system, from which node the message has been received or what kind of message is being received.

However, particularly in the dynamic segment of the FlexRay protocol, there may be hold-ups to messages because the messages which enter the FIFO buffer store for the transmission path are dealt with in succession and for this there is always only one particular time-slot available, which means that a message of lower priority that enters the buffer store before a message of higher priority may block the latter until such time as the time-slot for the message of lower priority opens. What this means is that a message that is the first to arrive at the buffer store is also the first to be passed on again.

DE 103 29 179 A1 describes a method, in particular one employing the FlexRay protocol, for managing a store between a communications controller and a host processor, which is referred to as such in the patent, belonging to a node on a network, each data message being assigned an identifier and there being additional control data that includes a pointer to the data associated with the identifier.

GB 2 389 492 A describes a method of transmitting messages employing a time-slot assisted transmission protocol, in which each time-slot has an identifier assigned to it. Each of the messages to be transmitted, i.e. a data transmission frame, has assigned to it a check value that is checked in the receiver to ensure that the message has been correctly transmitted.

US 2003/0099556 2 A1 discloses a method of transmitting messages on a wireless network with the help of time-slots, in which certain time-slots are assigned to a node on the network. If a node indicates that it requires more time for message transmission, a control means is able to allocate free time-slots to this node.

It is an object of the invention to provide a method of transmitting messages of the kind specified in the opening paragraph, in which messages stored in a buffer store are not blocked unnecessarily due to the fact of messages being assigned to free time-slots in an inflexible manner.

This object is achieved by virtue of the features specified in claim 1.

The key concept of the invention lies in the fact of the message to be transmitted, and a slot identifier that gives the position in the media access control, being decoupled from one another. This applies for example to the static segment of the FlexRay protocol or to time-multiplex-based systems in general. The way in which this is achieved is that each message, i.e. the data to be transmitted or a data transmission frame, has assigned to it a message identifier (MID) that can be distinguished from a slot identifier (SID). The messages are then placed in order in a transmit queue (TxQueue), being prepared in this way for transmission by the central control unit or host. This placing in order in the queue is preferably effected with the help of application software.

This queue is then assigned a set or group of slot identifiers to enable the messages to be transmitted one after the other on the network. These slot identifiers are of a preset size that depends on the transmission protocol that is selected in the given case. The dynamic assignment of the next message in the queue to the next available time-slot in the group of slot identifiers assigned is preferably effected by circuitry that is implemented.

The time-slots are then used in the transmission protocol for the transmission of the messages, the messages from the queue being transmitted one after the other in the successive time-slots that are preset by the group of slot identifiers. It is preferable for this purpose for all the messages to be of the same length. Any desired messages are assigned to any respective desired time-slots in this case, which means that a receiver of the message, in particular, is no longer able to draw any conclusions as to the sender or the nature of the message simply from the time-slot.

It goes without saying that, to allow the method to be performed, a network having nodes and a central host will be so designed in terms of hardware and/or software that the messages to be transmitted can be provided, either at the host or at each node, with a message identifier, can be placed in order in a queue and the queue can have assigned to it a set of slot identifiers, to make it possible for messages to be transmitted in the desired way from the host to the nodes or in the opposite direction, or between the nodes themselves. What are provided for this purpose are, in particular, respective FIFO buffer stores, referred to below simply as buffer stores for short, for the messages that have been arranged into a queue.

The advantage of the invention lies in the fact that a given bandwidth of a transmission medium, i.e. a channel for the transmission of messages, is provided for a message transmission, rather than messages being tied to a given time-slot in a fixed way, which means that a queue will not be blocked by a message of lower priority that is stored in a buffer store until such time as the time-slot assigned to the message opens.

Advantageous embodiments of the invention are characterized in the dependent claims.

The way of handling the queue that is specified in claim 2 ensures that a message that is the first to be read into a buffer store or that is stored there first will also be dispatched first. The result of this first-in, first-out method is that although it is ensured that the intended sequence of transmission of the messages is preserved, the exact time at which the message is actually transmitted is not laid down in advance, because what is used for the next outgoing message is, in each case, the next open time-slot that is available to the node.

In addition, each message may have a lapsing time assigned to it, as claimed in claim 3. This lapsing time specifies the maximum lifespan of the message to be transmitted. If this lifespan has elapsed before the message is transmitted, because for example a suitable time-slot has not yet been opened, the message is automatically deleted, to enable the capacity of the network not to be overloaded by outdated messages. In a motor vehicle, a message of this kind may for example be a less significant sensor signal such as an indication of outside temperature, the updating of which does not need to take place at fixed intervals of time. It goes without saying that for this purpose the nodes and the host have respective internal clocks that are synchronized with one another assigned to them, or the entire network is connected up to one central clock.

It is of course possible, as claimed in claim 4, for messages to be exchanged between a plurality of nodes, and/or a host, that together form a network. For this purpose, there are provided at the nodes, amongst other things, buffer stores for the queues of messages and means for transmitting and receiving the messages and for reading out the message identifiers.

It is proposed in claim 5 that the message transmission takes place in accordance with the FlexRay protocol, in which case use may be made of both the static and the dynamic part of the protocol. It is of advantage in this case that the message identifier is independent of the slot identifier in a receiving node or host, because the messages provided with a message identifier can be transmitted in any desired time-slots. Identification is performed simply by looking at the message identifier, which means that a node or host can detect from which other node or host the message was transmitted. The nodes may for example be numbered serially for this purpose.

It is possible in this case, as specified in claim 6, for the host for example to transmit a larger number of messages with a number of time-slots which is smaller than the number of messages. What this means is that the messages in the queue waiting to be transmitted are transmitted in succession in a plurality of cycles of, for example, the FlexRay protocol. Two messages per cycle for example may be transmitted in the dynamic segment of the FlexRay protocol, which means that two cycles are required for the transmission of four messages.

In the above, the invention has been described as essentially for the transmission of messages from a plurality of components or sensors and/or control means in a motor vehicle, as characterized in claim 7. However, it will be clear to the person skilled in the art that the method may also be used in networks of any other kind between a plurality of nodes and, where required, a host, in which case electrical conductors, glass-fiber cables and also wireless radio links may be used as channels for the transmission of messages.

It is also possible for the proposed method to be applied to other transmission protocols for which it is advantageous for the message identifier to be decoupled from the slot identifier, particularly when the occurrence of the slot identifier is determined by priority-based control, as it is for example in the case of a controller area network (CAN) protocol.

The proposed method of decoupling the message identifier from the slot identifier to assist queues on the transmission path of a node may also be combined, in the same node, with conventional methods of storing messages and with a fixed way of assigning a dedicated message store to a time-slot. Depending on the requirements to be met by the application, the emission, under the deterministic control of time, of messages whose assignment is fixed can be supported, as also can the simplified emission of messages that merely respects their sequence.

These and other aspects of the invention are apparent from and will be elucidated with reference to the embodiments described hereinafter.

Figure 1:
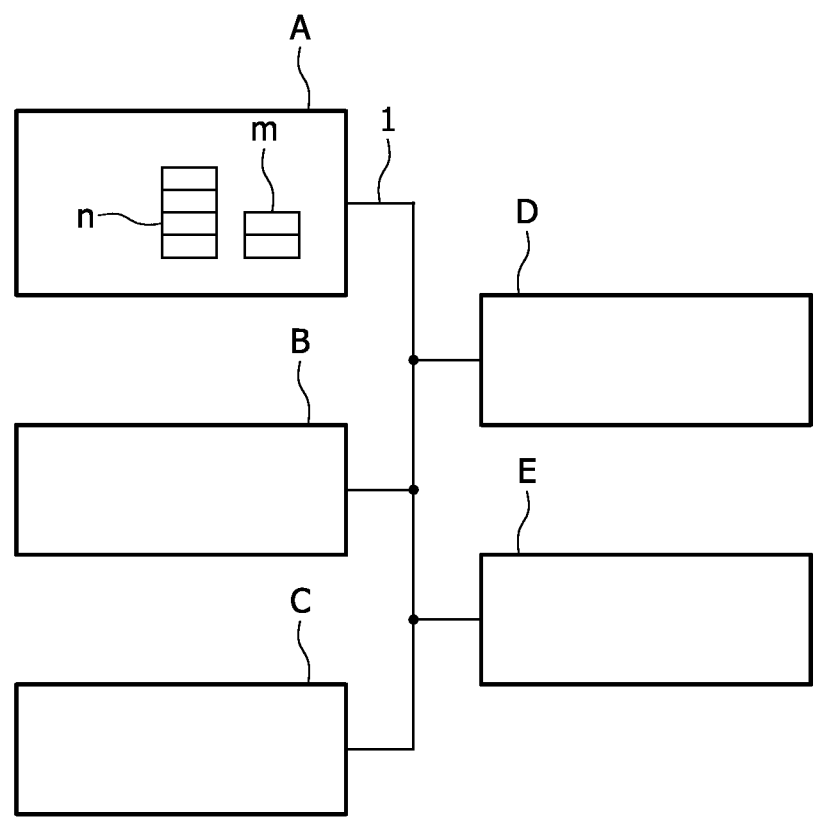
FIG. 1 shows the layout of a network, in diagrammatic form.

The embodiment shown in FIG. 1 is a network comprising five nodes A, B, C, D, E and a channel 1 for the transmission of messages between the nodes A, B, C, D, E, such as is used for example in automotive engineering for communication between a plurality of components of the motor vehicle. In principle, it is also possible for there to be two channels or other channel topologies.

Figure 2:
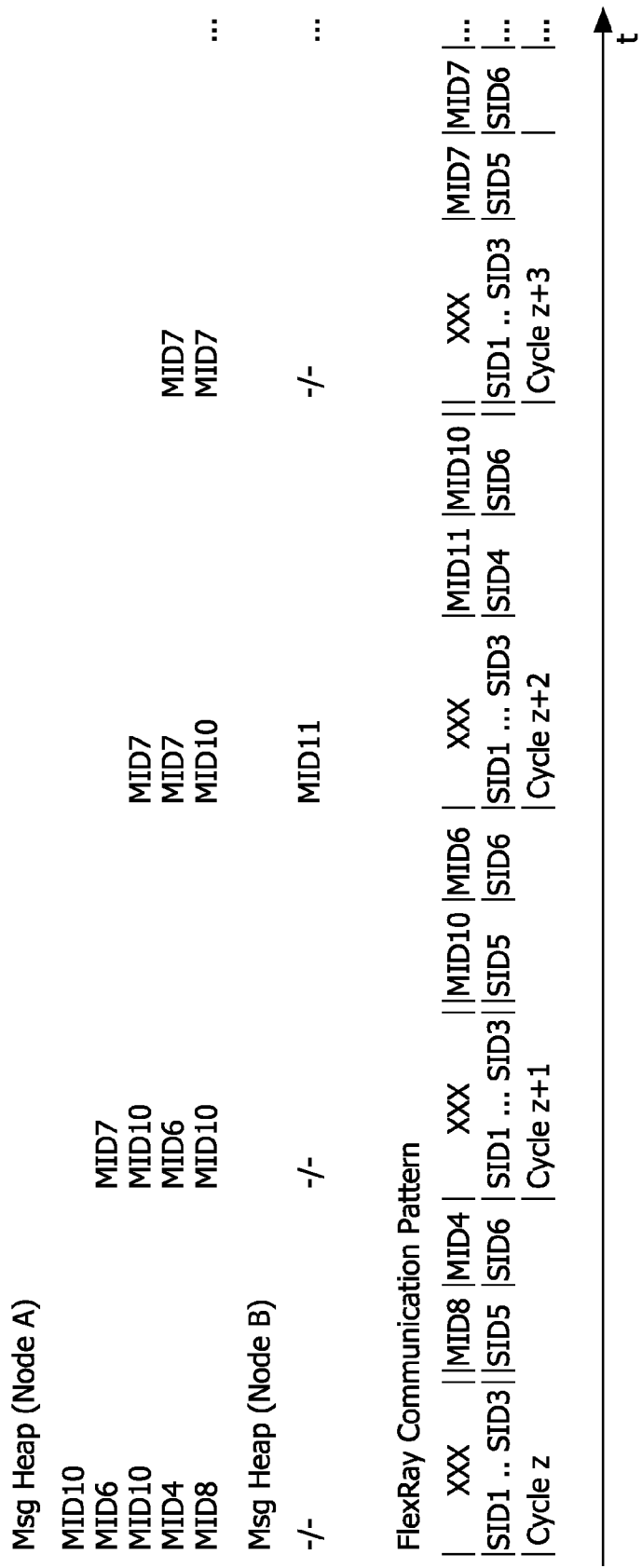
FIG. 2 shows a pattern in which message transmission takes place over time.

From the representation in FIG. 2 the pattern in which messages are transmitted over time can be seen. Basically, the FlexRay protocol is divided into a static segment SID1 to SID3 and a dynamic segment SID4 to SID6. Regardless of the number of time-slots m, a number of messages n is exchanged, the normal case being that n>m, e.g. it being selected that m=6 and n=15. For the sake of simplicity, it is assumed that all the messages are of the same length and that the dynamic segment is able to hold up to 2 messages per cycle.

Whereas there is a fixed correlation between MID1-3 and SID1-3 in the static segment, it is assumed that there is not a fixed correlation of this kind in the dynamic segment. The message identifier at the receiver is not dependent on the SID used for the MAC. Hence the MID fields that have been standardized for the FlexRay protocol, or other encodings, may be used for the transmission of messages.

The method is represented by way of example in the following table:

| Node ID | | Maintained IDs (MID, SID) | | | | | | |
|---------|-----|----|----|----|----|----|----|----|
| A | MID | 04 | 05 | 06 | 07 | 08 | 09 | 10 |
|   | SID | 05 | 06 |    |    |    |    |    |
| B | MID | 11 | 12 | 13 | 14 | 15 |    |    |
|   | SID | 04 |    |    |    |    |    |    |
| C | MID | 01 |    |    |    |    |    |    |
|   | SID | 01 |    |    |    |    |    |    |
| D | MID | 02 |    |    |    |    |    |    |
|   | SID | 02 |    |    |    |    |    |    |
| E | MID | 03 |    |    |    |    |    |    |
|   | SID | 03 |    |    |    |    |    |    |

In this example, SID5 and SID6 are allocated only to node A and SID4 only to node B. Node A emits messages MID4 to MID10 and node B emits messages MID11 to MID15. The other nodes share the static segment: node C is allocated SID1 and MID1, node D is allocated SID2 and MID2 and node E is allocated SID3 and MID3.

Where the buffer stores at nodes A and B have moved to the "full" state as shown by way of example, FIG. 2 shows the resulting flow of messages on the channel in the individual successive communication cycles. The assignment of the messages to the time-slots in the static segment (SID 1-3) is fixed (MID 1-3) and is therefore not shown in detail in FIG. 2, as indicated by xxx.

LIST OF REFERENCE NUMERALS

A, B, C, D, E Nodes on a network
1 Channel for message transmission
n Set of message identifiers (MID)
m Set of slot identifiers (SID)

The invention claimed is:

1. A method of transmitting messages using a transmission protocol having time-slots, characterized in that each message has a message identifier assigned to it, the method comprising:
  placing the messages in order in a queue, the queue having a set of slot identifiers assigned to it; and
  in response to one of the set of slot identifiers assigned to the queue becoming available, transmitting the next message in the queue using the one of the set of slot identifiers, wherein the set of time slot identifiers are used to transmit messages in dynamic time slots of the transmission protocol.

2. A method as claimed in claim 1, characterized in that the queue is handled by a first-in-first-out (FIFO) method.

3. A method as claimed in claim 1, characterized in that a lapsing time is assigned to each message.

4. A method as claimed in claim 1, characterized in that messages are transmitted between a plurality of nodes, or a host, on a network.

5. A method as claimed in claim 1, characterized in that the messages are transmitted in accordance with the FlexRay protocol.

6. A method as claimed in claim 1, characterized in that a number of messages (M) are transmitted with a number of time-slots (N), where M>N.

7. Use of the method as claimed in claim 1 in automotive engineering.

8. The method of claim 1, wherein:
  the set of slot identifiers assigned to the queue includes a plurality of slot identifiers.

9. The method of claim 1, wherein:
  the transmission protocol includes N time-slots; and
  the set of slot identifiers assigned to the queue includes M identifiers, where 0<M<N.

10. The method of claim 1, wherein transmitting the next message in the queue includes transmitting the message with the message identifier assigned to the message, in a time slot identified by the one of the set of slot identifiers.

11. The method of claim 10, further including receiving the transmitted message, and using the message identifier to identify the message independently from the time slot in which the message is transmitted.

12. A method of transmitting messages between a plurality of nodes on a network using a transmission protocol having time-slots, characterized in that each message has a message identifier assigned to it, the method comprising:
  for each of one or more of the nodes:
  assigning a respective set of time-slot identifiers to a queue of the node;
  placing the messages received at the node in order in a queue; and
  in response to a time-slot corresponding to one of the respective set of time-slot identifiers becoming available, transmitting the next message in the queue using the one of the respective sets of time-slot identifiers, wherein the set of time slot identifiers are used to transmit messages in dynamic time slots of the transmission protocol.

13. The method of claim 12, further comprising, for at least one of the plurality of nodes, assigning a message identifier to a respective time slot and corresponding time-slot identifier; and
  in response to receiving a message having said message identifier, transmitting the message using the time-slot corresponding to the message identifier.

14. The method of claim 13, wherein:
  the transmission protocol is the FlexRay protocol;
  the respective set of time slot identifiers corresponding to the one or more of the nodes are used to transmit messages in dynamic time slots of the FlexRay protocol; and
  the time-slot identifier corresponding to the at least one of the one or more nodes is used to transmit messages in a static time slot of the FlexRay protocol.

15. The method of claim 12, wherein transmitting the next message includes transmitting the message identifier assigned to the message.

16. The method of claim 12, wherein transmitting the next message in the queue includes transmitting the message with the message identifier assigned to the message, in a time slot identified by the one of the set of slot identifiers.

17. The method of claim 16, further including receiving the transmitted message, and using the message identifier to identify the message independently from the time slot in which the message is transmitted.

* * * * *